US006772328B1

United States Patent
Talbot et al.

(10) Patent No.: US 6,772,328 B1
(45) Date of Patent: Aug. 3, 2004

(54) DYNAMIC INITIALIZATION OF PROCESSOR MODULE VIA MOTHERBOARD INTERFACE

(75) Inventors: Gerald Talbot, Concord, MA (US); Hanwoo Cho, Concord, MA (US); Eric Rowe, Natick, MA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/335,939

(22) Filed: Jun. 18, 1999

(51) Int. Cl.[7] .......................... G06F 15/177; G06F 3/00
(52) U.S. Cl. ................... 713/1; 713/2; 710/8
(58) Field of Search .................... 713/1, 2, 100; 710/8, 62, 102, 129

(56) References Cited

U.S. PATENT DOCUMENTS

| | | | | |
|---|---|---|---|---|
| 4,589,063 A | * | 5/1986 | Shah et al. ................... 710/8 |
| 4,967,346 A | * | 10/1990 | Freidin ....................... 710/305 |
| 5,325,490 A | * | 6/1994 | Brasseur ..................... 710/129 |
| 5,371,892 A | * | 12/1994 | Petersen et al. ............... 713/1 |
| 5,463,742 A | * | 10/1995 | Kobayashi .................. 710/101 |
| 5,557,782 A | * | 9/1996 | Witkowski et al. ......... 713/600 |
| 5,625,802 A | | 4/1997 | Cho et al. ................... 395/500 |
| 5,706,424 A | * | 1/1998 | Whittaker et al. ........... 714/54 |
| 5,737,567 A | * | 4/1998 | Whittaker et al. ..... 365/185.33 |
| 5,850,513 A | * | 12/1998 | Whittaker et al. ............ 714/49 |
| 5,854,937 A | * | 12/1998 | Woodward ..................... 712/1 |
| 5,862,351 A | * | 1/1999 | He ................................ 713/1 |
| 5,898,846 A | * | 4/1999 | Kelly ........................ 710/104 |
| 5,918,023 A | * | 6/1999 | Reeves et al. ............... 710/102 |
| 5,951,665 A | * | 9/1999 | Crane, Jr. et al. ........... 710/126 |
| 5,983,297 A | * | 11/1999 | Noble et al. ................. 710/102 |
| 6,009,480 A | * | 12/1999 | Pleso ............................. 710/8 |
| 6,041,372 A | * | 3/2000 | Hart et al. ..................... 710/62 |
| 6,052,794 A | * | 4/2000 | Polzin et al. ................ 713/500 |
| 6,101,319 A | * | 8/2000 | Hall ........................ 395/183.18 |
| 6,154,834 A | * | 11/2000 | Neal et al. ................... 712/248 |
| 6,295,571 B1 | * | 9/2001 | Scardamalia et al. ....... 710/129 |
| 6,308,285 B1 | * | 10/2001 | Bowers ....................... 714/10 |

FOREIGN PATENT DOCUMENTS

| | | | | |
|---|---|---|---|---|
| EP | 574991 A | | 6/1993 | ........... G06F/13/40 |
| JP | 409319726 A | * | 12/1997 | |
| WO | WO 93/08532 A | | 4/1993 | ........... G06F/13/40 |

* cited by examiner

*Primary Examiner*—Thomas Lee
*Assistant Examiner*—Chun Cao
(74) *Attorney, Agent, or Firm*—Mills & Onello, LLP

(57) ABSTRACT

In a common processor module/motherboard interface, an interface protocol is defined such that a replacement processor module can be recognized by a common motherboard and such that a common processor module can be compatible with multiple motherboards. A module information field stored on a processor module includes status information pertaining to the processor module. When the processor module is coupled to a motherboard, the motherboard downloads the module information field and generates initialization commands for the processor module based on the retrieved module information field. The commands are transferred to the processor module for initialization of the processor.

13 Claims, 2 Drawing Sheets

DYNAMIC INITIALIZATION OF PROCESSOR MODULE VIA MOTHERBOARD INTERFACE

BACKGROUND OF THE INVENTION

Processor modules have become popular in recent years as a means for providing reliable and efficient computer system upgrades. In a processor module, a processor is mounted to a circuit panel containing electrical interconnection paths, for example a printed circuit board, along with support electronics, for example random access memory (RAM) in the form of processor cache. Module electronics communicate with electronics mounted to a computer motherboard via an interface in the form of a high-speed connector. Ideally, as system clock rates increase, and processor functions evolve, the outdated processor module assembly can be removed from the motherboard at its connector and replaced by an upgraded module capable of operating at the higher rate, and/or with improved functionality.

Such a straightforward processor module replacement is not necessarily achieved by contemporary systems. When a module is inserted, the motherboard electronics may not necessarily recognize the new processor or support hardware employed by the replacement module. Conversely, the replacement processor may not recognize the system interface or "chip set" of the motherboard. In such a situation, the processor module may not operate to optimum efficiency, or worse, may not function at all.

SUMMARY OF THE INVENTION

The present invention is directed to an apparatus and method for a processor module/motherboard interface wherein a common interface is provided such that a common processor module is compatible with a variety of motherboard configurations in a manner that allows for the processor to be initialized regardless of the motherboard configuration. The present invention further allows for future generations of processor modules to be fully compatible with a common motherboard. In this manner, an interface protocol is defined such that a replacement processor module can be recognized by a common motherboard and such that a common processor module can be compatible with multiple motherboards.

In one aspect, the present invention comprises a system for initializing a processor module connected to a motherboard. The processor module includes a processor; an initialization interface for receiving initialization commands for initializing the processor; a module information field, the module information field including status information pertaining to the processor module; and a first connector for transferring signals external to the processor module. The motherboard includes a second connector adapted to mate with the first connector for transferring signals between the motherboard and the processor module; a processor module information retrieval circuit for retrieving the module information field from the processor module through the first and second mating connectors; and an initialization command generator for generating initialization commands for the processor module based on the retrieved module information field, the processor receiving the initialization commands from the initialization interface through the first and second mating connectors.

In a preferred embodiment, the initialization interface comprises a serial interface, and the initialization commands comprise a serial bit stream. In an alternative embodiment, the initialization interface may comprise a parallel interface.

The processor module may further comprise a cache memory external to the processor and electronically coupled therewith. In this case, the module information field may include status information pertaining to the cache that is used for generating the processor initialization command. The initialization command may include commands for initializing the processor control registers, commands for initializing processor interfaces, or an initialization program to be operated by the processor to establish communication with the motherboard through the mating first and second connectors and for initializing hardware mounted to the motherboard.

The initialization command generator may comprise a control circuit for decoding data values stored in the, retrieved module information field; and a memory for storing a plurality of partial initialization sequences for a plurality of processors, the control circuit generating an initialization command from a subset of the initialization sequences based on the module information field. The memory may further include a programmable interface for updating the partial initialization sequences for updated processors. The partial initialization sequences may pertain to a plurality of processor types and processor clock rates.

The initialization command is preferably generated dynamically by the initialization command generator based on the retrieved module information field.

In another aspect, the present invention comprises a method for initializing a processor module connected to a motherboard. Status information pertaining to the processor module is stored in a module information field on the processor module. The motherboard retrieves the module information field from the processor module and generates initialization commands at the motherboard for the processor module based on the retrieved module information field. The initialization commands are transmitted to the processor module and used to initialize the processor module.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
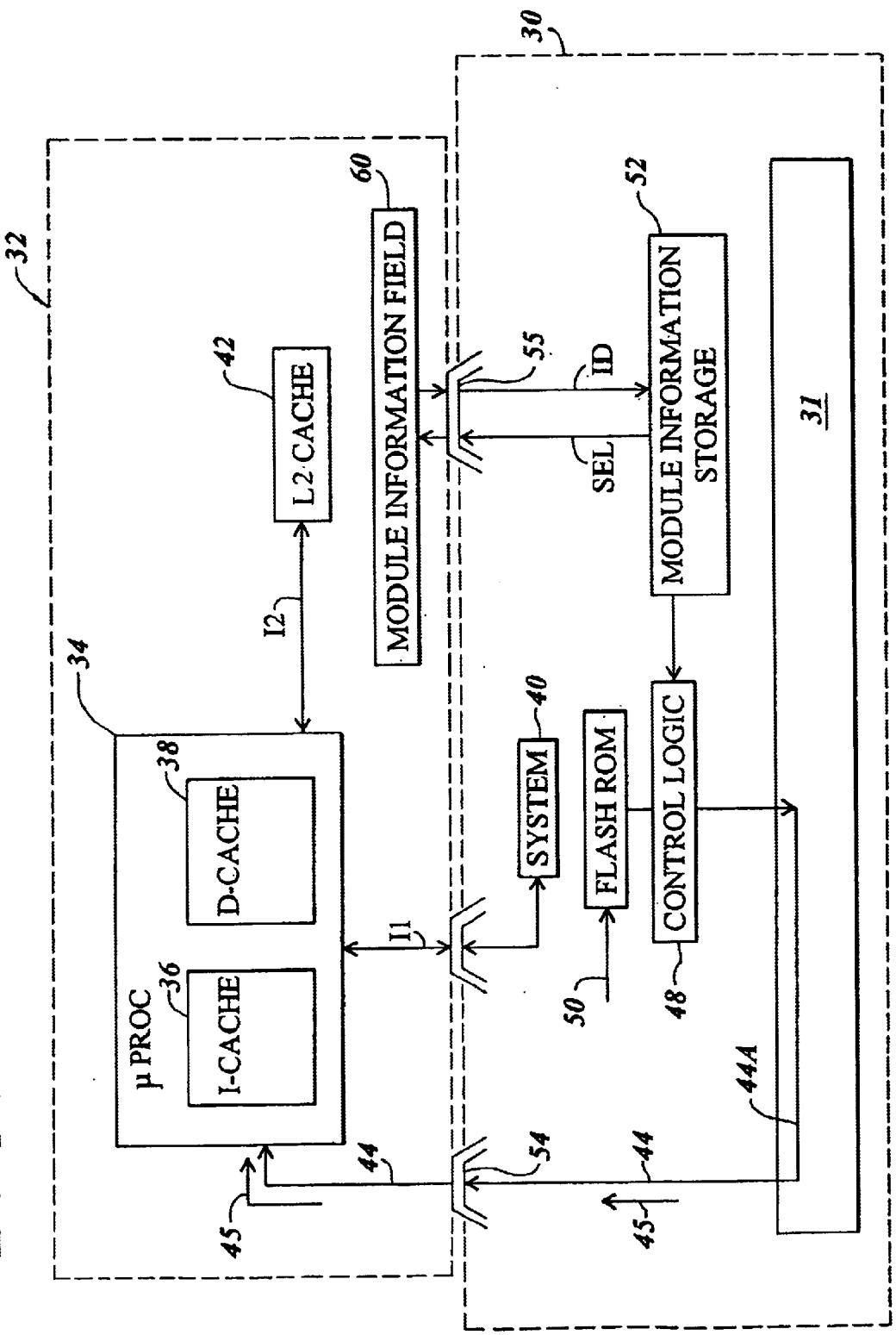
FIG. 1 is a schematic block diagram of a processor module/motherboard configuration that provides automated initialization and configuration of an inserted processor module in accordance with the present invention.

FIG. 1 is a schematic block diagram of a processor module/motherboard configuration that provides automated initialization and configuration of an inserted processor module in accordance with the present invention. A processor module 32 interfaces with a motherboard 30 at a connector, including a plurality of contacts, for example a serial load path contact 54 that provides an electrical pathway for a serial load path 44, and a module identification contact 55 that provides for communication of signals SEL, ID for downloading a module information field 60 from the processor module 32 to the motherboard 30.

The processor module 32 receives serial data 45, for example intialization commands, via the serial load path 44 that are input into the processor 34. The processor 34 includes internal memory in the form of instruction cache (I-cache) 36 and data cache (D-cache) 38, and includes at least two external interfaces I1, I2 for interfacing with a system interface 40, for example a system bus for communicating with the motherboard 30, and additional off-chip memory, for example level-2 (L2) cache 42.

A circuit panel 31 on the motherboard 30 includes a serial load path data line 44A for distributing the serial data 45 to the connector 54 sourced by a control logic block 48. The control logic 48 includes serialization hardware for generating the serial bit stream 45 for the various different phases of processor module initialization.

Figure 4:
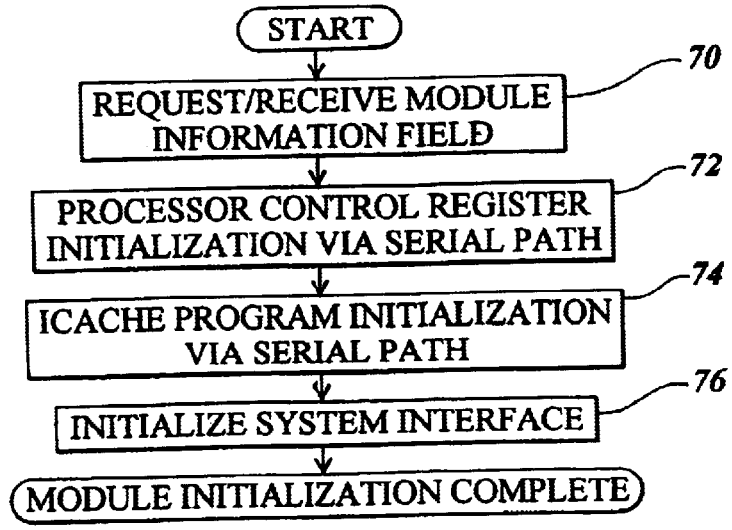
FIG. 4 is a flow diagram of the steps for performing the processor module/motherboard initialization sequence, in accordance with the present invention.

FIG. 4 is a flow diagram of the various phases of processor module initialization in accordance with the present invention. With reference to FIGS. 1 and 4, in a first step 70, upon power-up of the processor module 32, the motherboard 30 initiates a transfer of the module information field 60 from the processor module 32 to the motherboard 30, where it is held in storage 52 for later reference. With the processor information, the motherboard 30 is now in position to generate initialization commands 45 for the processor module 32.

In the next step 72, the initialization command generator, in the form of control logic 48, generates a serial sequence 45 for low-level initialization of processor control registers based on the information contained in the stored processor information field 52. Following this, in the next step 74, the initialization command generator 48 generates and transmits a program to be downloaded to internal processor memory, for example I-cache 36, again via serial sequence 45, to be executed by the processor for higher-level initialization, for example initialization of the external interfaces, I1, I2. Following this, in step 76, a serial command sequence 45 is generated and downloaded for initializing the system hardware 40, which, in turn, confirms communication with the motherboard 30 chip set.

In this manner, the present invention provides for dynamic construction of a serial bit stream for initialization and programming of an inserted processor module 32 in a manner that is consistent with allowing for upgradability of both the module 32 and the motherboard 30. The various stages of module initialization are described in further detail below, using the example of an Alpha™ processor, manufactured by Compaq Computer Corp.

During the first phase 70, the processor module 32 is seated on the motherboard at connector 54 and power is provided. During power-up, the processor 34 and related electronics mounted on the processor module 32 undergo a reset sequence whereby the motherboard 30 queries the processor module 32 to transmit information pertaining to the type of processor 34 and electronics 40, 42 installed on the module 32.

This information is stored in a module information field storage 52 on the motherboard 30 for future reference by the motherboard, for example, for reference during generation of the serial bit stream 45 by the control logic 48.

The information may contain processor-specific information such as core clock-rate, the type of processor, the type of support electronics, for example the type of cache-RAM, and the amount of RAM present on the processor module 32. With this core information, the control logic 48 is in position to begin generating commands to be transmitted serially to the processor module 32, in order to commence processor 34 initialization.

Figure 2:
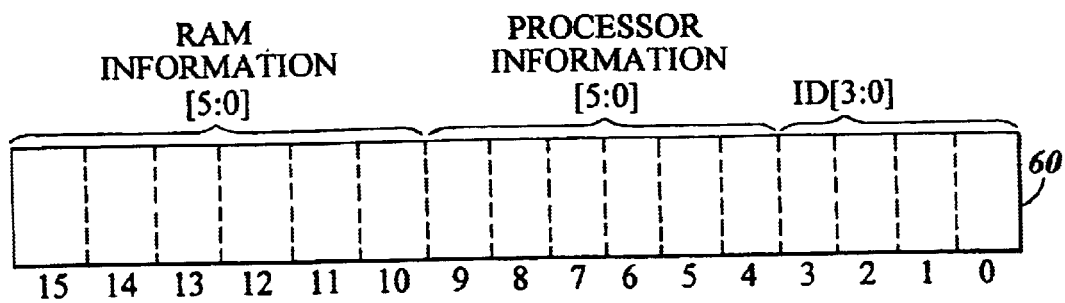
FIG. 2 is an illustration of the module information field stored on a processor module in accordance with the present invention.

FIG. 2 is an illustration of the module information field 60 stored on the processor module 32. The information field 60 may be permanently stored upon manufacturing of the processor module in the form of read only memory (ROM), where such ROM is available on the processor module, or alternatively may comprise hard-wired values set during manufacturing. In the example given in FIG. 2, the module information field 60 is partitioned into three data words. ID[3:0], processor information [5:0], and SRAM information [5:0]. The ID value, comprising bits [3:0] of the module information field 60, may contain an encoded data word related to serial bit transfer rates for the processor 34. The processor information value, comprising bits [9:4] of the module information field 60, may contain encoded data values indicating the type of processor, and the clock-rate of the processor. Note that the type of processor is not only limited to a generation of a particular processor, but may include other types of processors as well, for example, the interface may be adaptable to accommodate both Alpha™ family processors manufactured by Compaq Computer Corp. and X86™ family processors manufactured by AMD Corp. Similarly, the RAM information field, comprising bits [15:10] of the module information field 60, may include information as to the type of cache-RAM present on the module card, for example Single Data Rate (SDR) SRAM, or Double Data Rate (DDR) SRAM, the size of the RAM, for example the number off bytes, and the access time for the RAM. In this manner, the module information field 60 contains information for adequately identifying the hardware mounted to the processor module 32.

Figure 3:
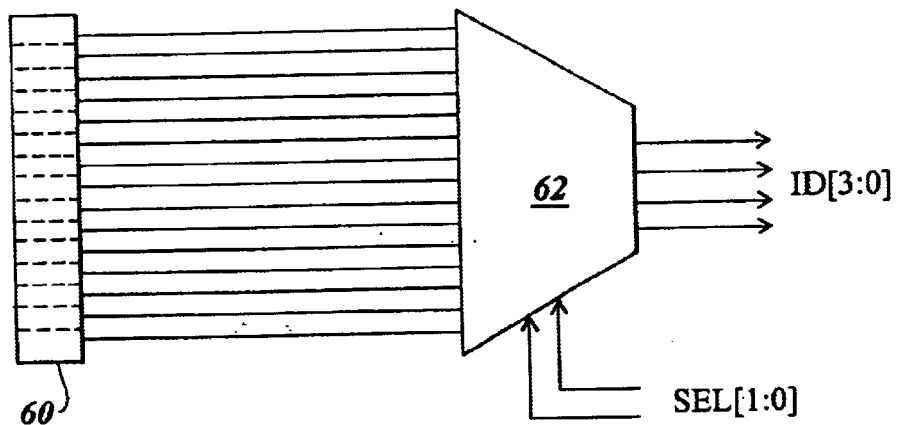
FIG. 3. is a schematic block diagram of a circuit for downloading the module information field from the processor module to the motherboard, in accordance with the present invention.

FIG. 3 is a schematic block diagram illustrating a circuit for downloading of the module information field 60 on the processor module 32 to the module information field storage location 52 on the motherboard 30. The module information field bits 60 are input to a multiplexer 62, for example a 16:4 multiplexer as shown, selected by select bits SEL[1:0], to provide a 4-bit output ID[3:0]. In this manner, and with reference to FIG. 1, following a processor module reset sequence, the select bits SEL are cycled to download the module information field, four bits at a time, such that data field bits ID[3:0] are returned to the motherboard via connector 55 and stored in module information field memory 52.

Returning to FIG. 4, following retrieval of the module information field 70 by the motherboard 30, processor control registers are initialized via the serial path 44 at step 72. In this process, the control logic 48 selectively accesses motherboard Flash ROM 46 to configure a serial data field containing processor-dependent data. For example, the processor-dependent data may comprise initialization commands for initializing the Alpha™ CBOX registers. A serial stream of bits, for example, 367 serial bits for the Alpha™ processor, are used to program the control registers and provide a configuration for the processor 34 state machine to configure the first and second off-chip interfaces I1, I2, along with additional programmable states. This serial stream is loaded from flash ROM memory 46, and modified by the control logic 48 according to the module information field stored in storage 52.

Following low-level processor initialization, step 74 of FIG. 4 performs a second level of processor initialization, for example by loading program instructions into processor I-cache ,36 via the serial load path 44. The software loaded into the I-cache 36 performs a higher level of initialization of the processor 34 and external interfaces I1, I2. The software is configured by control logic 48 which selectively accesses, or fetches a number of blocks stored in memory, for example flash ROM 46. As an example, a first portion of this initialization program may comprise a 12-bit fetch count which indicates a variable number of fetch blocks that follow. Following the fetch count, a variable number of 193-bit fetch blocks in descending sequence are provided such that the last fetch block in the serial transfer corresponds to the I-cache fetch block at an offset of 0. Each fetch block in the serial sequence contains all the internal I-cache bits including each fetch block tag, address space number, address space match, valid bits, and history bits, in accordance with standard protocol for the processor.

The fetch blocks contain adequate code to drive the initialization of the processor from its built-in self-test state at the outset of initialization, through to the completion of the external interface configuration, such that the processor cache instruction fetch may employ external cache RAMs, system memory, or peripheral device memories such as a parallel ROM containing basic input/output system or diagnostic firmware. A preferred initialization program probes the external interface to locate system memory controllers, firmware ROMs, and peripheral devices including switches and jumpers providing input to select a variety of initialization options. The initialization program further configures the system controller 40 such that both the processor 34 and the system controller 40 configurations are compatible when the processor initialization program accesses its external interface. For the Alpha™ example, standard processor initialization practices are provided in section 11.5 of the Compaq 21264 specification, DS-0013C-TE, revision 4.2, incorporated herein by reference.

In alternative embodiments, in addition using a serial ROM 46 having a fixed content to supply the configuration data and initialization program fetch blocks, a combination of input signals, programmable logic, and one or more parallel ROMs or flash-RAMs can be employed to dynamically configure an initialization command sequence.

The present invention employs any of a number of computation choices for the control logic 48 suitable for providing the equivalent serial initialization sequences. The design trade-off is between the complexity of programmable logic for creating the serial bit sequence, the number of input signals and options, the number and size of the memory devices, the complexity of the program that compiles and formats the initialization program, the number of different motherboard and processor configurations requiring support, the complexity of the initialization program itself, and the dependency of the initialization program on external peripheral devices. By providing complete initialization options to the formulation of the initialization program, the initialization sequence of the processor can be made to be completely independent of the correct functioning of the system controller and its external peripheral devices. The processor itself must be, of course, in working order, to complete processor initialization and to diagnose the entire rest of the system including the external devices. Furthermore, since the initialization program is computed according to the same inputs and options as the configuration data, the initialization firmware preferably has access to the particular loaded processor module configuration, even though that data is not directly available from the processor. Finally, the same serialization control logic 48 can simultaneously support either simple computations that directly emulate a serial ROM, or complex computations that perform the full dynamic initialization; this single logic block 48 therefore supports systems that may need only one or a few configurations as well as systems with thousands of configuration choices.

A preferred embodiment employs memory in the form of Flash ROM 46, a programmable control logic 48, and eight sets of programmable option fields, for example ranging from 3–6 binary bits in width using manual jumpers and switches on the motherboard 30. The memory 46 preferably contains a multiple-entry table of the 367-bit processor configuration data bit strings. The serialization logic 48 computes an index into the table that is a function of the processor information (bits 9:4) and RAM information (bits 15:10) portions of the module information field 60 shown in FIG. 2, along with a three-bit motherboard attribute field. Following transmission of the 367-bit configuration data, the serialization logic 48 transmits a twelve-bit fetch count embedded as a fixed constant in each table entry of the multiple-entry configuration data table. A fixed length is used because the initialization program preferably utilizes the maximum allowable size of the processor I-cache 36.

Following transmission of the fetch count, the serialization logic 48 uses the processor information portion of the module information field 60 to provide an initialization program to the processor, as described above. This is followed by system interface initialization commands, as described above.

Returning to FIG. 1, an optional interface 50 is provided, for example in the form of a memory-mapped interface, to allow for reprogramming of the flash-ROM 46 in the field. This allows for flexibility in the case where a future processor is to be installed which was not conceived of when the motherboard was originally built; the flash ROM can be re-programmed with an updated set of processor configurations before the new processor is installed.

While this invention has been particularly shown and described with reference to preferred embodiments thereof, it will be understood by those skilled in the art that various changes in form and in detail may be made therein without departing from the spirit and scope of the invention as defined by the appended claims.

For example, although the above description provides the example of a serial load path for transmitting initialization commands to the processor module, a parallel load path is equally applicable to the present invention, for those processors employing such a parallel load path. Although a single processor is shown in FIG. 1 a multiple processor configuration, for example a parallel processor configuration is equally applicable to the present invention.

In an alternative embodiment, a processor-type identifier signal, hardwired on the processor module, can be transferred to the motherboard at reset, to indicate to the motherboard the architecture of the processor module, as described in U.S. Pat. No. 6,516,373, filed Jun. 18, 1999, entitled "Common Motherboard Interface for Processor Modules of Multiple Architectures", by Gerald Talbot et al., incorporated herein by reference.

We claim:

1. A system for initializing a processor module connected to a motherboard comprising:

a processor module comprising:
- a processor for execution of program instructions;
- an initialization interface for receiving initialization commands for initializing said processor;
- a module information field, said module information field including status information pertaining to said processor module; and
- a first connector for transferring signals external to said processor module; and a motherboard comprising:
- a second connector adapted to mate with said first connector for transferring signals between said motherboard and said processor module;
- a processor module information retrieval circuit for retrieving said module information field from said processor module through said first and second mating connectors; and
- an initialization command generator for dynamically generating initialization commands for the processor module based on said retrieved module information field, wherein said processor on the processor module receives said initialization commands generated at said motherboard in the form of a serial bit stream from said initialization interface through said first and second mating connectors, and said processor on the processor module initializes in response to the received initialization commands prior to execution of program instructions by the processor thereby confirming system bus signal communication between the processor module and the motherboard via the first and second connectors.

2. The system of claim 1 wherein said initialization interface comprises a serial interface.

3. The system of claim 1 wherein said processor module further comprises a cache external to said processor and electronically coupled therewith, and wherein said module information field includes status information pertaining to said cache that is used for generating the processor initialization command.

4. The system of claim 1 wherein the initialization command includes commands for initializing processor control registers.

5. The system of claim 1 wherein the initialization command includes commands for initializing processor interfaces.

6. The system of claim 1 wherein the initialization command comprises an initialization program to be operated by the processor to establish communication with the motherboard through the mating first and second connectors, and for initializing hardware mounted to the motherboard.

7. The system of claim 6 wherein the initialization command generator comprises:
- a control circuit for decoding data values stored in said retrieved module information field; and
- a memory for storing a plurality of partial initialization sequences for a plurality of processors, said control circuit generating an initialization command from a subset of said initialization sequences based on said module information field.

8. The system of claim 7 wherein said memory includes a programmable interface for updating said partial initialization sequences for updated processors.

9. The system of claim 7 wherein said partial initialization sequences pertain to a plurality of processor types and processor clock rates.

10. A method for initializing a processor module connected to a motherboard comprising:
- storing status information pertaining to said processor module in a module information field on said processor module;
- retrieving, at said motherboard, said module information field from said processor module;
- dynamically generating initialization commands, at said motherboard, for said processor module, based on said retrieved module information field;
- transmitting said initialization commands in the form of a serial bit stream to a processor on said processor module; and
- initializing said processor on said processor module in response to said initialization commands generated at said motherboard prior to execution of program instructions by the processor, thereby confirming system bus signal communication between the processor module and the motherboard.

11. The method of claim 10 wherein generating initialization commands comprises generating commands for initializing processor control registers on said processor module.

12. The method of claim 10 wherein generating initialization commands comprises generating commands for initializing processor interfaces on said processor module.

13. The method of claim 10 wherein generating initialization commands comprises generating an initialization program to establish communication with said motherboard for initializing hardware mounted to the motherboard.

* * * * *